United States Patent
Duca, Jr. et al.

(10) Patent No.: US 9,886,717 B2
(45) Date of Patent: Feb. 6, 2018

(54) SYSTEM AND METHOD FOR SELECTING INTERCONNECTS

(71) Applicant: Tyco Electronics Corporation, Berwyn, PA (US)

(72) Inventors: Robert Joseph Duca, Jr., Rochester, NY (US); Michael Lee Willis, Dillsburg, PA (US); Karen Paul Seubert, Camp Hill, PA (US)

(73) Assignee: TE CONNECTIVITY CORPORATION, Berwyn, PA (US)

(*) Notice: Subject to any disclaimer, the term of this patent is extended or adjusted under 35 U.S.C. 154(b) by 343 days.

(21) Appl. No.: 14/515,863

(22) Filed: Oct. 16, 2014

(65) Prior Publication Data

US 2015/0253958 A1     Sep. 10, 2015

Related U.S. Application Data (60) Provisional application No. 61/949,627, filed on Mar. 7, 2014.

(51) Int. Cl.
| | | |
|---|---|---|
| *G06F 3/00* | (2006.01) | |
| *G06Q 30/06* | (2012.01) | |
| *G06F 17/50* | (2006.01) | |

(52) U.S. Cl.
CPC ......... *G06Q 30/0641* (2013.01); *G06F 17/50* (2013.01)

(58) Field of Classification Search
CPC ........ G06F 3/0481; G06F 3/0482; G06F 8/34; G06Q 30/0601; G06Q 30/0641

USPC ...... 715/771, 853, 854, 855; 705/26.1, 26.5; 706/46; 703/4
See application file for complete search history.

(56) References Cited

U.S. PATENT DOCUMENTS

| | | |
|---|---|---|
| 4,733,354 A | 3/1988 | Potter et al. |
| 4,775,935 A | 10/1988 | Yourick et al. |
| 5,182,793 A | 1/1993 | Alexander et al. |
| 6,012,051 A | 1/2000 | Scurlock et al. |
| 6,035,283 A | 3/2000 | Rofrano et al. |
| 6,751,622 B1 | 6/2004 | Puri et al. |
| 7,113,920 B1 | 9/2006 | Brisiel et al. |
| 7,246,087 B1 | 7/2007 | Ruppelt et al. |
| 7,299,202 B2 | 11/2007 | Swanson et al. |
| 7,315,830 B1 | 1/2008 | Bendler et al. |
| 7,343,328 B1 | 3/2008 | Smith et al. |
| 7,558,773 B2 | 7/2009 | Mancisidor et al. |
| 7,702,601 B2 | 4/2010 | Boyle et al. |

(Continued)

*Primary Examiner* — Haoshian Shih (57) ABSTRACT

A method of selecting interconnection products using a computer-based interconnection selection tool, the method comprising: (a) providing an image to a user, the image depicting multiple interconnections, each interconnection having a referenced interconnection level; (b) receiving a selected interconnection level of interest; (c) providing at least one interconnection prompt corresponding to a given interconnection level of interest; (d) receiving at least one response to the interconnection prompt; (e) providing interconnection options responsive to the at least one response; (f) receiving at least one product selection from the interconnection options and storing the product selection to a list; (g) optionally reiterating steps (c)-(g) until a prompt is provided in step (c) for each level of a group of interconnection levels or the user terminates the process; and (h) after step (g) or the user terminates the process, providing the list to the user.

21 Claims, 11 Drawing Sheets

(56) References Cited

U.S. PATENT DOCUMENTS

| | | | |
|---|---|---|---|
| 7,870,033 | B2 | 1/2011 | Swanson et al. |
| 7,895,012 | B2* | 2/2011 | Turicchi, Jr. ........ G06F 11/3409 |
| | | | 702/127 |
| 7,974,872 | B2 | 7/2011 | Katayama et al. |
| 7,974,875 | B1 | 7/2011 | Quilici et al. |
| 8,200,552 | B2 | 6/2012 | Swanson et al. |
| 8,245,150 | B2 | 8/2012 | Katter et al. |
| 8,249,885 | B2 | 8/2012 | Wurtz et al. |
| 8,341,030 | B2 | 12/2012 | Westphal et al. |
| 9,292,872 | B2* | 3/2016 | Jacob Sushil |
| 2002/0072979 | A1 | 6/2002 | Sinha et al. |
| 2008/0103936 | A1 | 5/2008 | Churlik et al. |
| 2008/0270159 | A1 | 10/2008 | Constable et al. |
| 2008/0283598 | A1* | 11/2008 | Ghafarzadeh .......... G07C 13/00 |
| | | | 235/386 |
| 2010/0280867 | A1 | 11/2010 | Diaz et al. |
| 2012/0296776 | A1 | 11/2012 | Kalai et al. |
| 2012/0310781 | A1 | 12/2012 | Battle et al. |
| 2013/0204750 | A1* | 8/2013 | Nordman ............. G06Q 10/087 |
| | | | 705/28 |
| 2015/0127494 | A1* | 5/2015 | Bhaowal ............ G06Q 30/0635 |
| | | | 705/26.81 |

* cited by examiner

Drill-down to Ideal Product Family

Attribute descriptions & questions to ask

Level 3: Board to Board Connections Product Selection Matrix: Mother/Daughter

Connector density involves a number of factors, please share the following with me to help determine the right connector for your application.

Density

PCB Mount Style

There are numerous ways to attach the connector to the PCB. These questions will assist in isolating the specific method required for your application.

| Product Family | Does your board to board One Piece or Two Piece | What is the rate Max Data Rate (Gbps) | What is the pitch / centerline spacing required? Pitch/Centerline Spacing (mm) | What number rows are required? Number of Rows | What number of active circuits are required? Actual Number of Positions | What are the number of signals required per linear inch? Lines per Board Space (n/cm) | What is the minimum distance between the daughter cards? Minimum PCB Card Pitch (mm) | Thru-hole (Y/N) | Thru-hole w/ SMT compatible housing (SMC) (Y/N) | SMT (Y/N) | Press-Fit (Y/N) | Will you require interconnect to the opposite side of the PCB? Pasted (Y/N) | Will a wire or cable be applied to this connector? Crimp Snap (Wire) (Y/N) |
|---|---|---|---|---|---|---|---|---|---|---|---|---|---|
| NIMPAK HDL Connectors (Signal) | Two | 1 | 2.00 | 5 | 4 - 18 | 60 [24] | 15.00 | Y | N | N | Y | N | N |
| Z-PACK 2mm FB (Futurebus+) Connectors | Two | 1 | 2.00 | 4 | 24 - 264 | 52 [29] | 16.00 | Y | Y | N | Y | N | N |
| Z-PACK 2mm FB (Futurebus+) Connectors | Two | 1 | 2.00 | 5 | 30 - 330 | 65 [25] | 15.00 | Y | Y | N | Y | Y | N |
| Z-PACK 2mm HM (Hard Metric) PCB Connectors | Two | 2.5 | 2.00 | 5 | 55 - 125 | 65 [25] | 16.00 | N | N | N | Y | Y | N |
| Z-PACK 2mm HM (Hard Metric) PCB Connectors | Two | 2.5 | 2.00 | 8 | 88 - 208 | 104 [40] | 24.00 | N | N | N | Y | Y | N |

Filter appropriate attributes

Select for part detail

| My Projects | Project: xxx | Summary (0) |

Product Summary

Please enter the details requested below. Enter the required details for the products shown and select Save for each.

Glossary  Help    ● Live Product Chat

| Customer: | Acme Electronics | | Name: | Karen Seubert |
| Location: | TX | | Industry Segment: | Subsystems |
| Opportunity/Project Name: | xxx | | Competitor: | TBD |
| Design Engineer: | John Smith | | Project Start Date: | 02-12-2014 |

| | TE Part Number | Quantity | Estimated Annual Value ($ USD) | Expected First Order Date | Process Status (Quoted, Sampled, Testing, Production) | Project Status (Pending, Won, Lost, Dead) |
|---|---|---|---|---|---|---|
| Level 2: Component to PC Board | | | | | | |
| DIMM Sockets | | 0 | 0  $ USD ▼ | mm/dd/yyyy | mm/dd/yyyy ▼ | mm/dd/yyyy ▼ |
| DIP Sockets | | 0 | 0  $ USD ▼ | mm/dd/yyyy | mm/dd/yyyy ▼ | mm/dd/yyyy ▼ |
| Level 3: PCB to PCB - Mother Daughter | | | | | | |
| MINIPAK HDL Connectors (Power & Signal) | | 0 | 0  $ USD ▼ | mm/dd/yyyy | mm/dd/yyyy ▼ | mm/dd/yyyy ▼ |
| SEC II Power Connectors (Signal) | | 0 | 0  $ USD ▼ | mm/dd/yyyy | mm/dd/yyyy ▼ | mm/dd/yyyy ▼ |

☒ Tell us what you think

SYSTEM AND METHOD FOR SELECTING INTERCONNECTS

REFERENCE TO RELATED APPLICATION

This application is based on and claims priority to U.S. Provisional Application No. 61/949,627, filed Mar. 7, 2014, incorporated herein by reference.

FIELD OF INVENTION

The present invention relates generally to a tool for assisting a user to select a product, and, more specifically, to a system and method for assisting the user to select optical and electrical interconnect.

BACKGROUND

Electrical and optical interconnections are critical to essentially all electronic devices, machines, and telecommunications. Interconnections relate to a variety of different interface connections, including, for example, circuit board to circuit board connections, component to circuit board connections, cable connections between circuit boards, and sub-assemblies to sub-assemblies, just to name a few. Indeed, in essentially every electrical or optical system, there are many different levels of interconnect that have to be selected to optimize the performance of the system.

Selecting the right interconnect is becoming more and more challenging. First, the number of applications requiring such interconnects have exponentially increased in recent years. And the number of available interconnects have likewise increased. Thus, at this time, it is essentially impossible for anyone to know the all of the available interconnect options to easily determine the optimum interconnect for a given application. Rather, salespeople and users typically rely on past experience and their own knowledge of available interconnect to select the most appropriate interconnect for a particular application. Obviously, given that no one person can recall all of the available interconnect options, such an approach is unlikely to optimize the interconnect selection. Complicating matters, in a typical sales situation, an interconnect selection needs to be made quickly, so often there is insufficient time to flip through pages of catalogs to determine the right interconnect. The current approach, is to use an e-catalog where products are presented in an electronic format on the user's computer. Such an e-catalog is beneficial in that it allows users to browse interconnect solutions critically and facilitates the electronic capture of desired interconnects, it still lacks the ability to guide the user to the optimal solution.

Failing to optimize interconnect selection not only undermines the credibility of the salesperson or user, but also reflects poorly on the particular interconnect used in less than optimum conditions.

Therefore, there is a need for an interconnect selection approach that is intuitive and leads to a determination of the optimum interconnect for a given application. The present invention fulfills this need among others.

SUMMARY OF INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The interconnection selection tool of the present invention guides a user through different levels of interconnection to systematically address and investigate options to determine the best solution. More specifically, the approach of the present invention utilizes the interconnection hierarchy disclosed in 1987 AT&T Technical Journal (hereby incorporated by reference). The interconnection hierarchy establishes a logical progression of interconnects from primary connections (Level 1) to system to system connections (Level 6). The present invention uses this logical progression to prompt the user to consider various issues and alternatives and it guides the user from lower level interconnections to higher level interconnections. This approach also allows users to see images of interconnects, and then select links to product details and alternatives. Thus, the tool allows the user to capture opportunities at every level of the application.

Accordingly, one aspect of the invention is a method that uses the interconnection hierarchy to systemically approach interconnect selection. In one embodiment, the method comprises: (a) providing an image to a user, said image depicting multiple interconnections, each interconnection having a referenced interconnection level; (b) receiving a selected interconnection level of interest; (c) providing at least one interconnection prompt corresponding to a given interconnection level of interest; (d) receiving at least one response to said interconnection prompt; (e) providing interconnection options responsive to said at least one response; (f) receiving at least one product selection from said interconnection options and storing said product selection to a list; (g) optionally reiterating steps (c)-(g) for the next interconnection level in sequence until the highest interconnection level is reached or said user terminates process; and (h) after the highest interconnection level is reached or said user terminates selection process, providing said list with interconnect links to said user.

Another aspect of the invention is a system that uses the interconnection hierarchy to systemically approach interconnect selection. In one embodiment, the system comprises: a processor; a data store operatively connected to said processor; and memory operatively connected to said processor and being configured to instruct said processor to execute at least the following steps: (a) providing an image to a user, said image depicting multiple interconnections, each interconnection having a reference indicating its interconnection level; (b) receiving a selected reference indicating an interconnection level of interest; (c) providing at least one interconnection prompt corresponding to a given interconnection level of interest; (d) receiving at least one response to said interconnection prompt; (e) providing interconnection options responsive to said at least one response; (f) receiving at least one product selection from said interconnection options and storing said product selection to a list on said data store; (g) reiterating steps (c)-(g) for the next interconnection level in sequence until the highest interconnection level is reached or said user terminates process; and (h) after the highest interconnection level is reached or said user terminates selection process, providing said list with interconnect links to said user.

Yet another aspect of the invention is a computer-readable medium comprising instructions for enabling a computer-based system to use the interconnection hierarchy to systemically approach interconnect selection. In one embodiment, the instructions enable the system to execute at least the following steps: (a) providing an image to a user, said image depicting multiple interconnections, each interconnection having a referenced interconnection level; (b) receiving a selected interconnection level of interest; (c) providing at least one interconnection prompt corresponding to a given interconnection level of interest; (d) receiving at least one response to said interconnection prompt; (e) providing interconnection options responsive to said at least one response; (f) receiving at least one product selection from said interconnection options and storing said product selection to a list; (g) optionally reiterating steps (c)-(g) for the next interconnection level in sequence until the highest interconnection level is reached or said user terminates process; and (h) after the highest interconnection level is reached or said user terminates selection process, providing said list with interconnect links to said user.

The approach of the present invention provides for a number of advantages. First, because the present invention moves the interconnection selection process from an ad hoc approach to a systematic approach, the optimization of the selection is increased greatly. And because selections are optimized, they will also tend to become more consistent among similar applications. Improved and faster product selection builds user confidence making them more likely to select additional products across all interconnection levels through this tool equating to increased revenue and profitability due to ease of use and self-serve capability. Furthermore, because the systematic approach considers different levels of interconnection (as well as various options within a given level), the approach necessarily prompts the user to consider other interconnection levels that he or she might not have otherwise considered when simply focusing on a given interconnect level. Additionally, once the interconnect selection is optimized for lower levels, those interconnection selections will prompt the user to make selections for higher levels. In other words, specifying lower level interconnect will dictate higher level interconnect and allow the user to consolidate an entire application with a particular brand of interconnect.

In addition to optimizing the selection of connectors, the approach of the present invention facilitates marketing and management of the interconnect product lines. Specifically, the previous ad hoc approach of interconnection selection did not lend itself to systematic data gathering. However, the present system and method naturally accumulates data regarding the markets and applications for particular interconnect product lines. Such information not only facilitates future sales to a particular customer with similar applications, but also provides a management tool to determine product line deficiencies and product line redundancy among the different interconnection levels. The improved data capture also allows for targeted marketing campaigns based on the user's levels of interconnection interest and specific product needs. That is, because information about the customer and its needs can be collected in the system of the present invention, marketing to the particular customer can be targeted.

Aside from providing a user with a structured, systematic methodology for selecting interconnects, the ability for the user to simply select products and have an electronically prepared list greatly improves efficiency and accuracy of their interconnect selection. Furthermore, because in one embodiment, much of the questions and prompts are provided in graphical form, the reliance on language is minimized, lending itself to international use.

DETAILED DESCRIPTION

Figure 1:
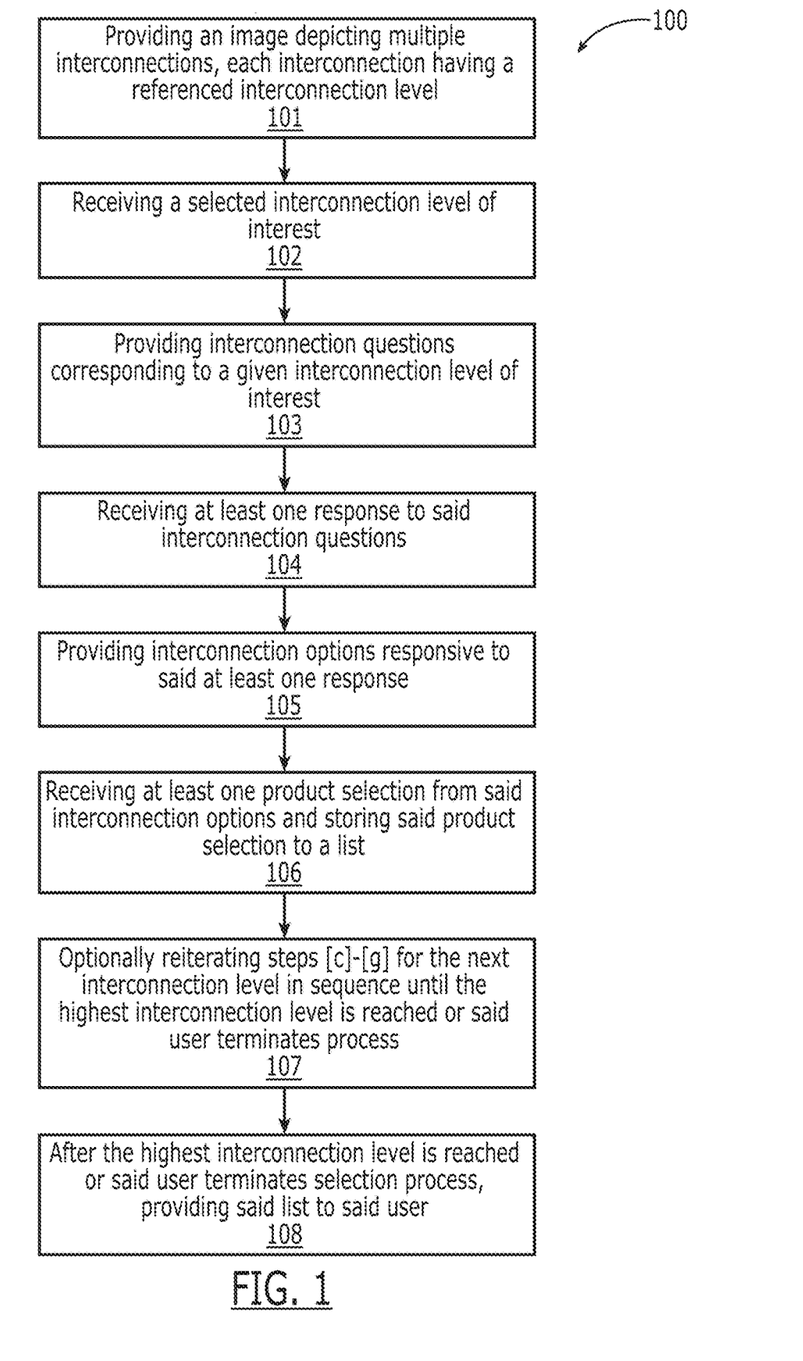
FIG. 1 is a flowchart of one embodiment of the process of the present invention.

Referring to FIG. 1, a flow chart 100 of one embodiment of the method of selecting interconnection products is shown. In step 101, the system 700 (see FIG. 7) provides an image to a user, the image depicting multiple interconnections, each interconnection having a referenced interconnection level. In step 102, the system 700 receives a selected interconnection level of interest. In step 103, the system 700 provides at least one interconnection prompt corresponding to a given interconnection level of interest. In step 104, the system 700 receives at least one response to said interconnection prompt. In step 105, the system 700 provides interconnection options responsive to said at least one response. In step 106, the system 700 receives at least one product selection from said interconnection options and stores said product selection to a list. In step 107, the system 700 optionally reiterating steps 103-106 for the next interconnection level in sequence until the highest interconnection level is reached or said user terminates process. Finally, in step 108, the system 700 provides said list with links to said user.

Figure 7:
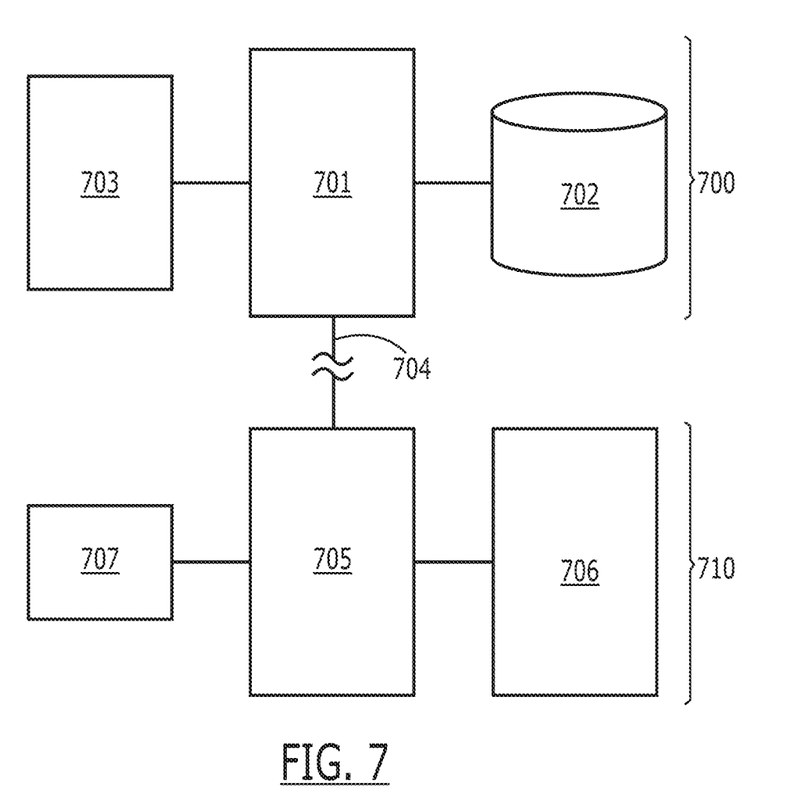
FIG. 7 is a system diagram of one embodiment of the present invention.

Referring to FIG. 7, one embodiment of a system 700 for performing the steps described above is shown. The system 700 comprises at least a central processor unit 701 and memory 703. The system 700 may be configured to allow processing to occur on more than one processor unit, and that the processing units need not reside on a single computer, nor must the CPUs reside at a single physical site. Once the CPU processes the information, the memory 102 stores the results. The system 700 may also include a data storage component 702 for storing information associated with the aforementioned process and product selections.

In one embodiment, the server or CPU 701 is networked with a user computer 710 as shown in FIG. 7. Although the system 700 is connected to the user computer 710 over a network 704 in a server/client configuration as shown in FIG. 7, it should be understood that any known networking configuration can be used such as peer-to-peer or cloud computing. On the user side, the user computer 710 comprises a processing unit 705, a display 706, and a user interface 707. The user interface may comprise traditional equipment such as a keyboard and mouse for entering information, as well as more exotic equipment such as scanners, voice recognition systems, touch screens, and 3D graphics displays. It is anticipated that system 700 can be configured to accommodate any user interface both known and in the future.

Each of the steps of FIG. 1 is considered below in greater detail and with reference to one or more embodiments. It should be understood, however, that these embodiments are provided for illustrative purposes only and the claims should not be limited to such embodiments unless expressly indicated.

Referring to FIG. 1, in step 101, an image is provided to the user depicting multiple interconnections with each interconnection having a referenced interconnection level. As mentioned above, the interconnection level refers to the interconnection hierarchy disclosed in AT&T Technical Journal 1987 (herein "AT&T Interconnection Hierarchy). A summary of the interconnection levels is set forth below:

Level 0: Gate-to-gate interconnections on the silicon die
Level 1: Connections from the chip to its package
Level 2: PCB, from component to component or to external connector
Level 3: Connections between PCBs, including backplanes or motherboards
Level 4: Connections between subassemblies, for example a rack
Level 5: Connections between physically separate systems, using for example an Ethernet LAN
Level 6: External Interconnections Between Systems and/or Peripherals
Level 7: Interconnections at the Building Wall Plate.

Figure 6:
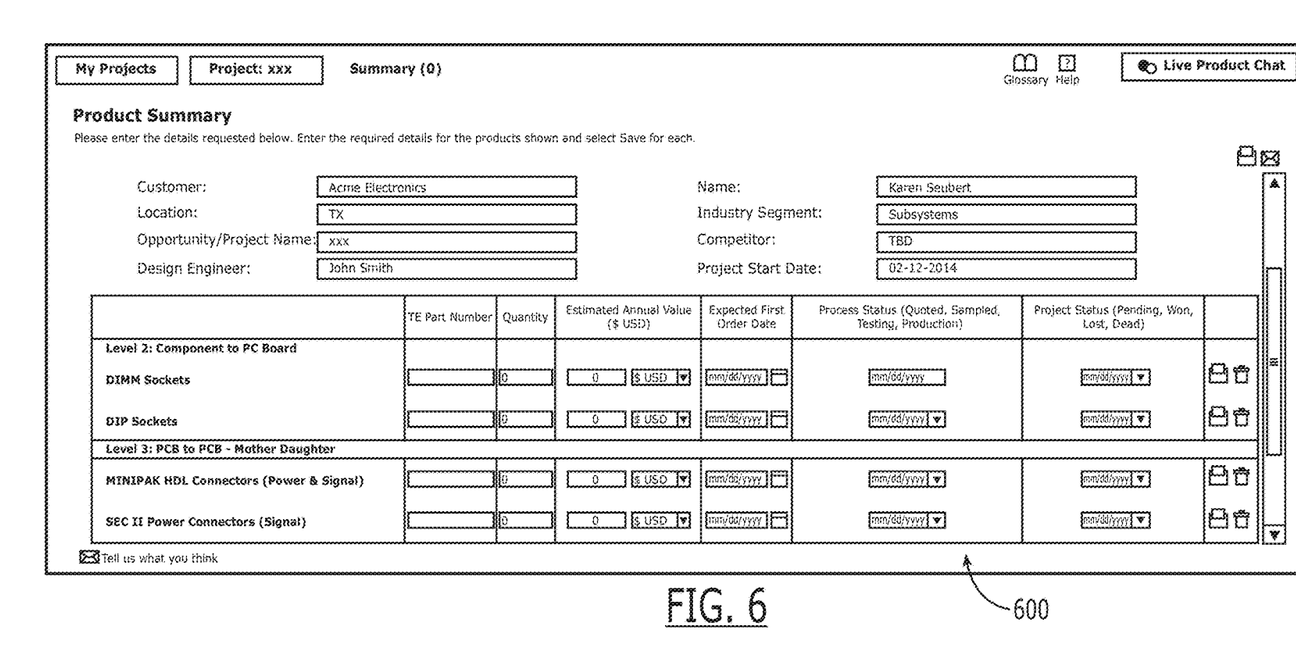
FIG. 6 is a screen shot of a product list generated according to one embodiment of the system and method of the present invention.

This is a well-known protocol that established a logical progression from component interconnections to larger system connections. The image may be provided to the user in different ways. For example, in one embodiment, the process is executed on a server remote from the user such that the image is transmitted in a known electronic format which is then received by the user and displayed on the users' computer (the message is received on the users' computer 705 and displayed on the users' display 706 as shown in FIG. 6).

Figure 2:
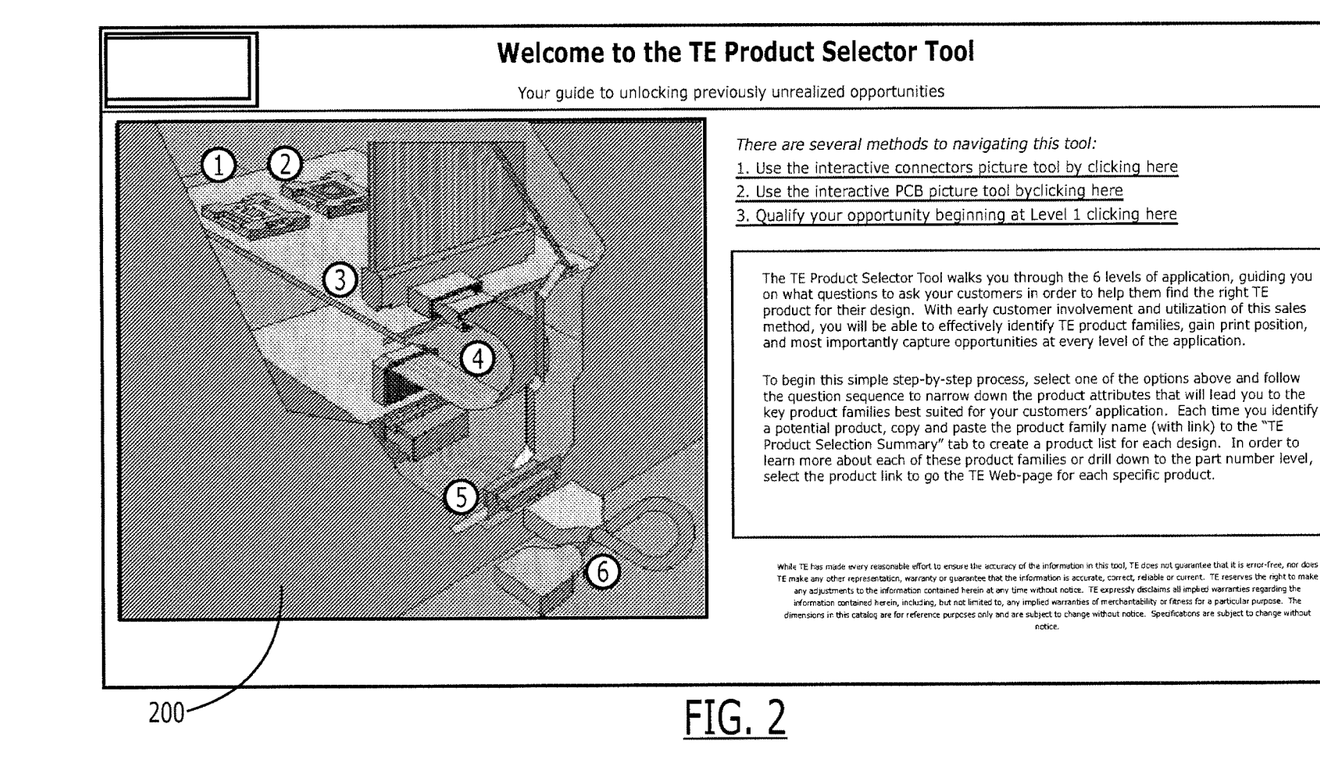
FIG. 2 is a screenshot of an image depicting multiple interconnection levels.
Figure 2A:
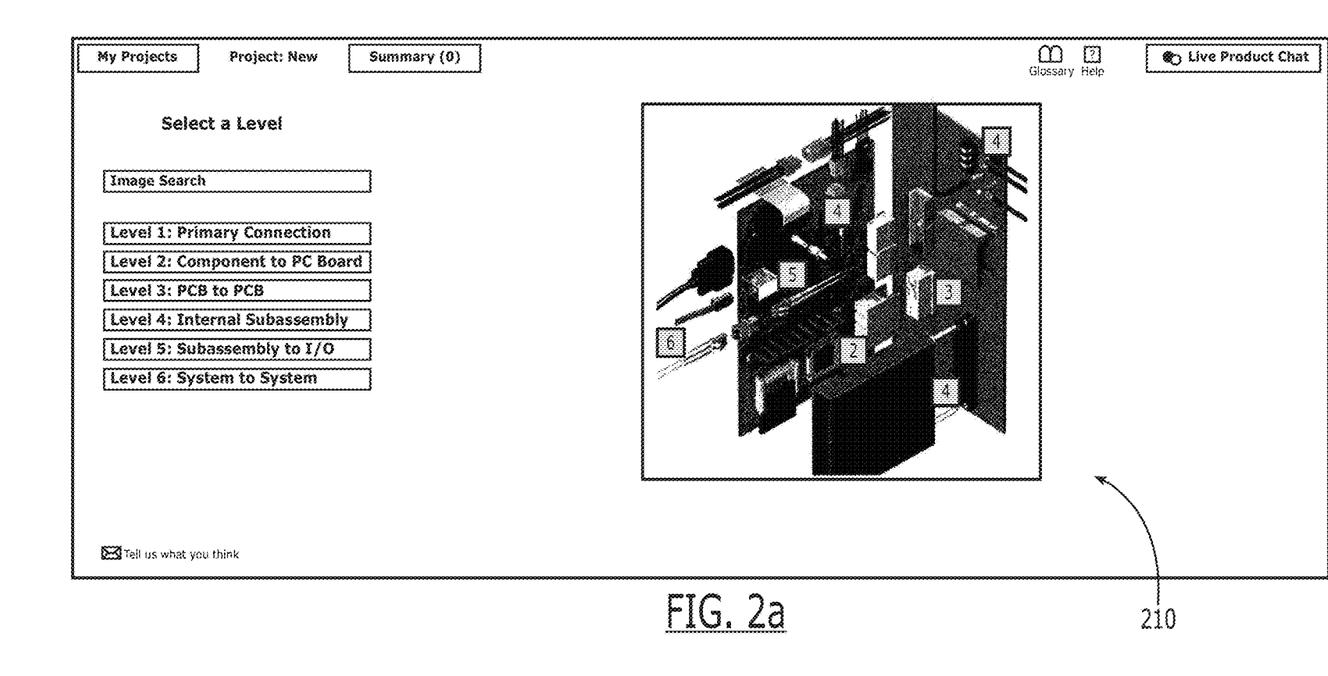
FIG. 2a is a screenshot of an alternative image depicting more realistic images of multiple interconnection levels with the interconnect products provided by a particular company.

Referring to FIG. 2, the screenshot 200 of one embodiment of the image depicting multiple interconnection levels is shown. As shown, screenshot 200 shows the hierarchy of interconnection from level 1 to level 6. FIG. 2A shows a screenshot 210 of an alternative embodiment of the image depicting interconnections for a specific brand of interconnect. In this respect, it should be noted that the interconnect depicted are actual products of a particular brand, and only the interconnection levels which are supported by the particular brand are represented.

In step 102, the user selects an interconnection level of interest. The user can do this in a variety of ways. For example, in one embodiment, the user clicks on a particular interconnection level of interest. Once the user selects a particular interconnection level of interest, that selection is transmitted and is received by the system as depicted in step 102.

Figure 3A:
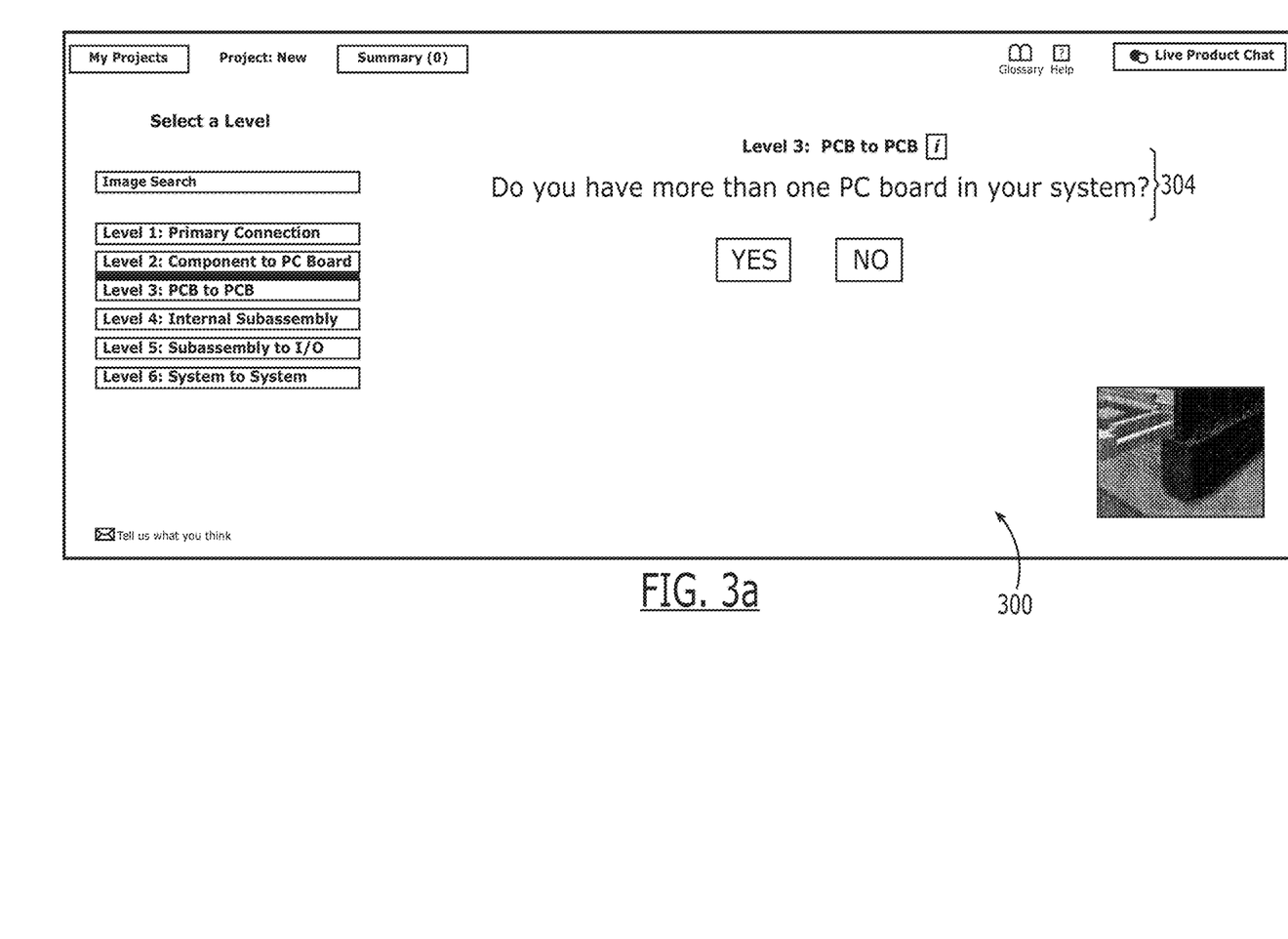
FIGS. 3a and 3b are screenshots of different prompts corresponding to interconnection level 3.
Figure 3B:
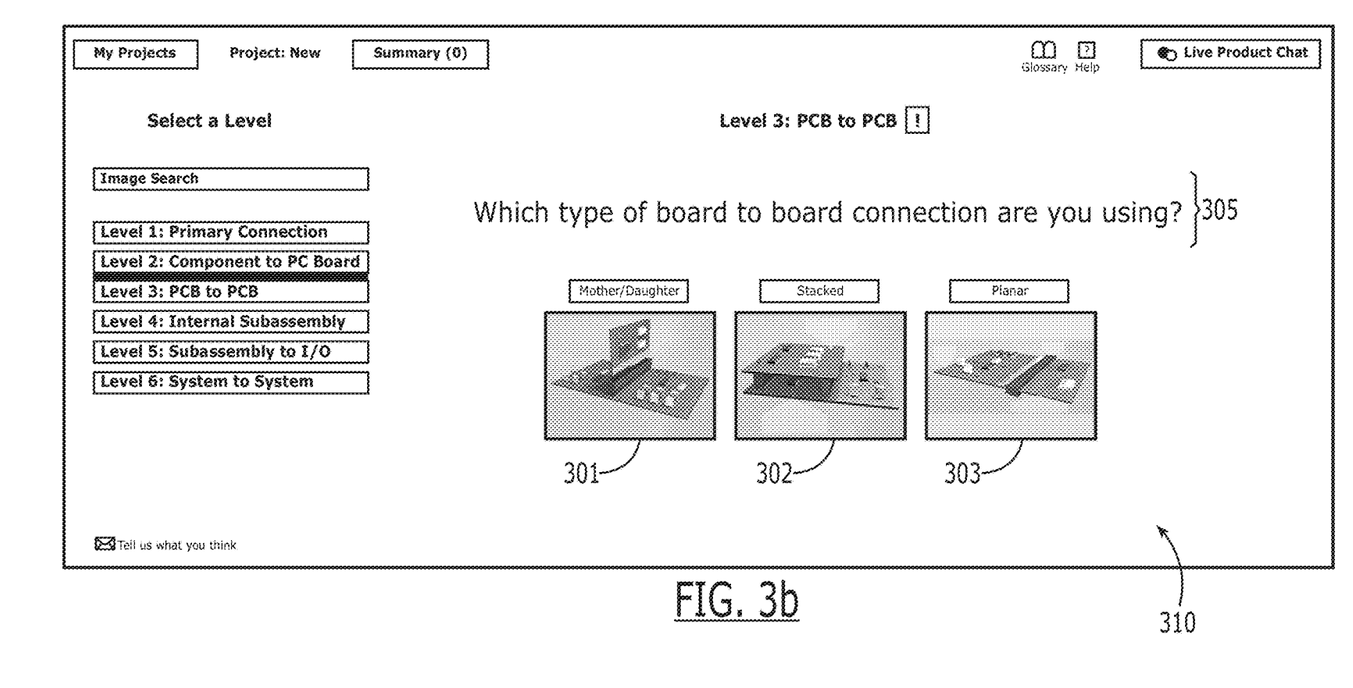

In step 103, the system provides the user with questions or prompts corresponding to a given interconnection level of interest. For example, referring to FIG. 3a, a screenshot 300 is shown depicting question in section 304. More specifically, in this particular embodiment, prompts in connection with interconnection level 3 (board-to-board connections) are provided. In one embodiment, the interconnection questions provided in step 103 also comprise questions to validate whether the present level is the correct interconnection level. For example, in section 304, a question is asked whether there is more than one board in the system. If there is only one board, then there is no board-to-board connection and the user is prompted to advance to the next level (level 4). If however there is more than one board in the system, then the question asks how the boards are connected as depicted in section 305 of the screenshot 310 shown in FIG. 3b. In one embodiment, the interconnection prompts comprise descriptions of different configurations of the interconnection and requests the user to select one of the configurations. For example, in this particular embodiment, the depictions are graphically illustrated as shown in images 301 through 303. Image 301 corresponds to a mother/daughter configuration, Image 302 corresponds to a stacked configuration, and Image 303 corresponds to a plainer configuration. Therefore, screenshots 300, 310 in FIGS. 3a and 3b provide questions that not only prompt the user to select the appropriate interconnection configuration, but also ensure that the user is at the proper interconnection level. As used herein, the term "proper interconnection level" means the interconnection level that is relevant to the user's needs.

Once the user has reached the proper interconnection level, it selects a particular interconnection configuration, which, in the embodiment disclosed in FIG. 3b, pertains to one of the images 301 through 303. Once the user selects one of those images, a response is received by the system as shown in step 104.

Figure 4:
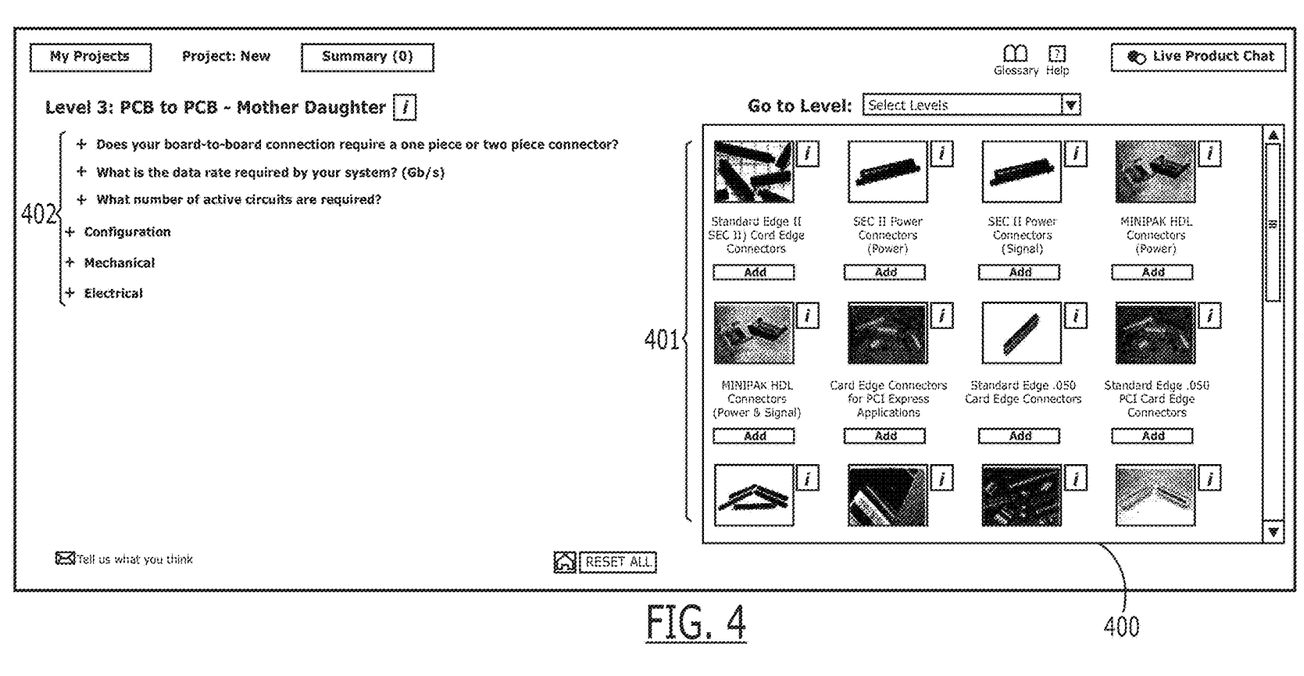
FIG. 4 is a screenshot of available products responsive to the user's response to the prompts shown in FIGS. 3a and 3b.

In step 105, once a response to the interconnection prompts is received in step 104, the system provides the user with interconnection options. Interconnection options provided in this step can vary for the different interconnection levels. The interconnection options typically, although not necessarily, include a list of specific products with questions to help the user identify which of those products is best suited for the application. For example, referring to FIG. 4, the screenshot 400 shows a product family for board-to-board connections in a mother/daughter configuration (i.e., image 301 in FIG. 3b). In one embodiment, a product family 401 is provided to the user along with additional questions or prompts 402 to narrow the selection as shown in FIG. 4. In this embodiment, a more narrowed selection of products 403 is provided if the user expands the questions 402 to their expanded form 405 and responds to them as shown in the screenshot 410 of FIG. 4a. In an alternative embodiment shown in the screenshot 420 of FIG. 4b, rather than providing the user with prompts to narrow the selection, a matrix 425 is provided in which the products are listed vertically and questions are listed horizontally such that each question focuses on the particular attributes of the different product provided. Still other approaches for presenting the interconnect options will be obvious to one of skill in the art in light of this disclosure.

Figure 5:
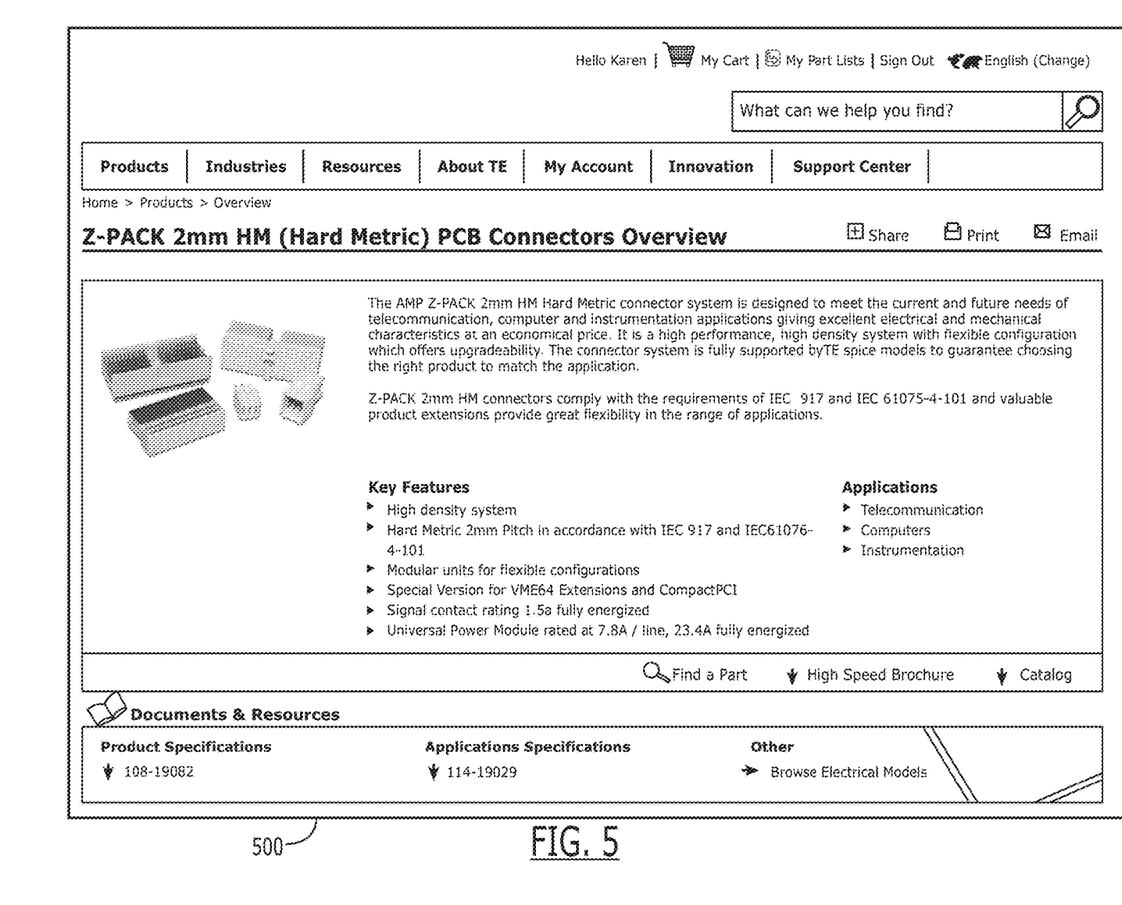
FIG. 5 is product detail corresponding to one of available products depicted in FIG. 4.

In one embodiment, the user can click on the listed products to bring up product details as shown in the screenshot 500 of FIG. 5. In this particular embodiment, a particular mother/daughter board-to-board interconnect is provided, along with its specification and key features.

Figure 4A:
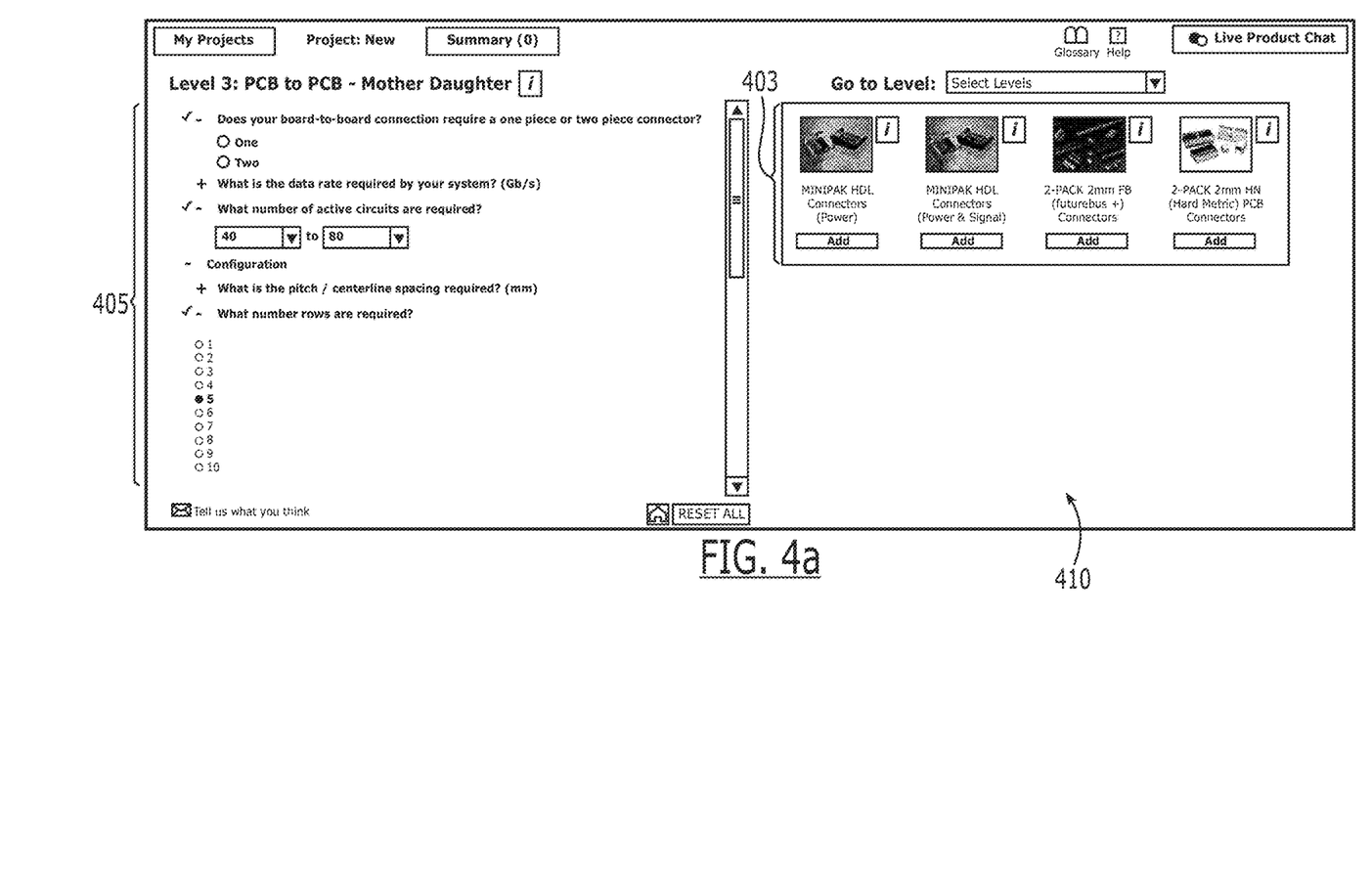
FIG. 4a is a screenshot of a more specific set of available products responsive to the user's response to prompts provided in the screen shot of FIG. 4.
Figure 4B:
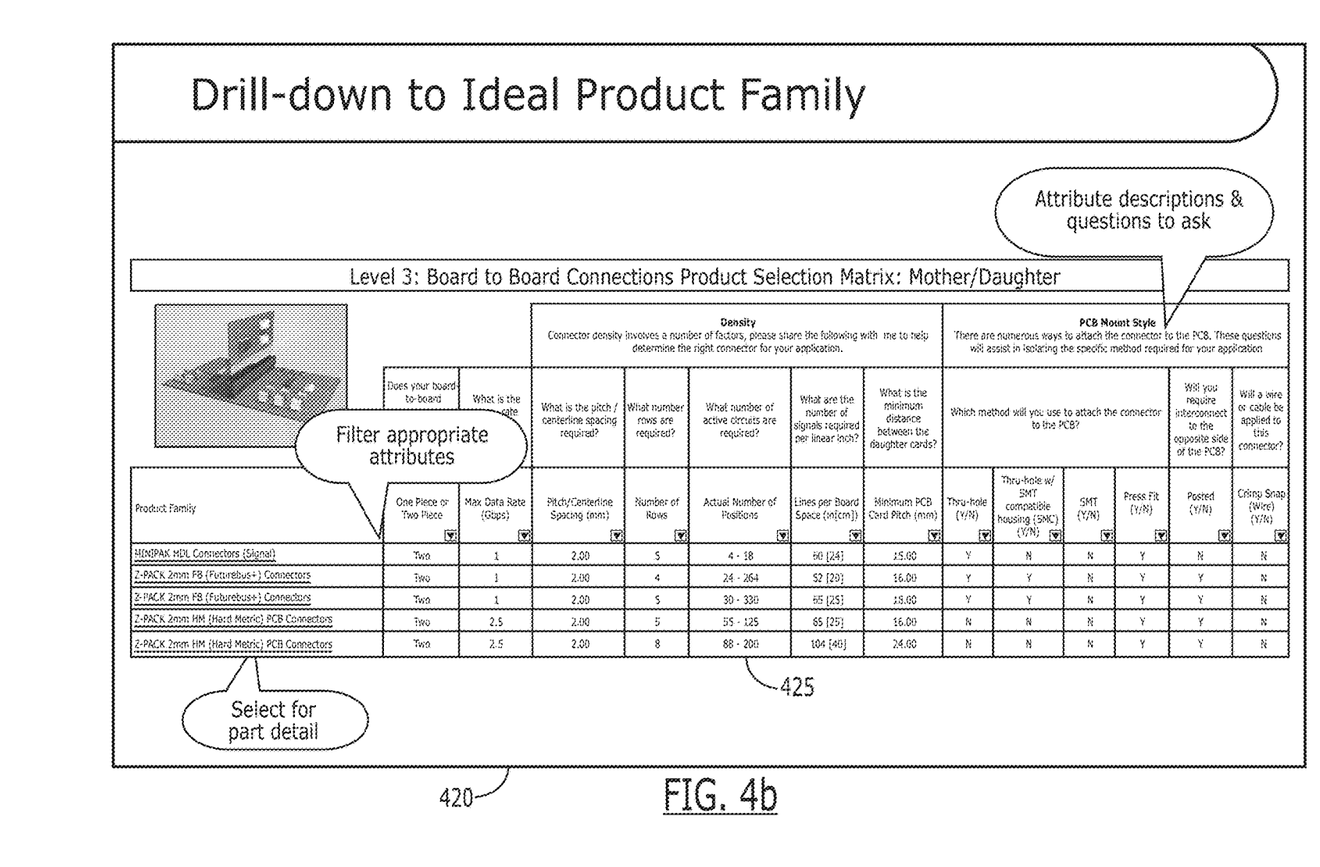
FIG. 4b is an alternative screenshot embodiment of the available products.

Using the interconnection options, as shown for example in FIG. 4a, the user selects the product that best suits the particular application. That selection is received by the system in step 106. In one embodiment, once this selection is received from the user, a bill of materials or shopping list is created which can be used to facilitate shipping/purchasing as well as data collection. That is, as mentioned above, the system not only provides for interconnection selection and ordering, but also provides for systematic data gathering to allow administrators of the system to understand better what customers are buying in certain applications, thereby facilitating focused marketing and product development.

In step 107, the system optionally reiterates steps 103 through 106 for subsequent interconnection levels to ensure that the user takes a comprehensive view of all of the interconnection requirements for a given application. Although it is generally preferred that the system step through the various interconnection levels, it is not required, and at any time, the user may terminate the selection process and proceed to step 108 in which the list of selected products is provided to the user. For example, referring to FIG. 6, a screenshot 600 of a product list is provided to the user. This particular screenshot includes the product name, the part number, quantity, cost, order date, and status of the order or quote. It should be understood, however, that the form of the list will depend on the user needs. For example, in one embodiment, the list is simply displayed for the user and can be cut and pasted into an order or similar document. Alternatively, in one embodiment, step 108 involves transmitting the list to not only the user, but also to the manufacturer/shipping department such that the selected products may be packaged and shipped to the customer. It should also be understood that in addition to the list being presented for shipping purposes, it may also be provided for billing and other accounting purposes.

While this description is made with reference to exemplary embodiments, it will be understood by those skilled in the art that various changes may be made and equivalents may be substituted for elements thereof without departing from the scope. In addition, many modifications may be made to adapt a particular situation or material to the teachings hereof without departing from the essential scope. Also, in the drawings and the description, there have been disclosed exemplary embodiments and, although specific terms may have been employed, they are unless otherwise stated used in a generic and descriptive sense only and not for purposes of limitation, the scope of the claims therefore not being so limited. Moreover, one skilled in the art will appreciate that certain steps of the methods discussed herein may be sequenced in alternative order or steps may be combined. Therefore, it is intended that the appended claims not be limited to the particular embodiment disclosed herein.

What is claimed is:

1. A method of selecting interconnection products using a computer-based interconnection selection tool, said method comprising:
    (a) providing an image to a user, said image depicting multiple interconnections, each interconnection having a referenced interconnection level, each referenced interconnection level corresponding to one of level 0, level 1, level 2, level 3, level 4, level 5, level 6, or level 7 said level 0 corresponding to gate-to-gate interconnections on a silicon die, said level 1 corresponding to connections from a chip to a package of said chip, said level 2 corresponding to PCB connections, from one component to another component or to an external connector, said level 3 corresponding to connections between PCBs, including backplanes or motherboards, said level 4 corresponding to connections between subassemblies; said level 5 corresponding to connections between physically separate systems, said level 6 corresponding to external interconnections between systems and/or peripherals, and said level 7 corresponding to interconnections at a building wall plate;
    (b) receiving a selected interconnection level from said user;
    (c) providing at least one interconnection prompt corresponding to said selected interconnection level;
    (d) receiving at least one response to said interconnection prompt;
    (e) providing interconnection options responsive to said at least one response;
    (f) receiving at least one product selection from said interconnection options and storing said product selection to a list;
    (g) optionally reiterating steps (c)-(f) for another interconnection level; and
    (h) after step (g) or said user terminates the process, providing said list to said user.

2. The method of claim 1, wherein providing comprises transmitting to a user's computer for display on said user's computer.

3. The method of claim 1, wherein, in step (c), said interconnection prompts comprises descriptions of different configurations of said selected interconnection level and a request for said user to select one of said configurations.

4. The method of claim 3, wherein said different configurations are displayed pictorially.

5. The method of claim 4, wherein said user selects one of said configurations by selecting a representative graphic of said one of said configurations.

6. The method of claim 3, wherein said selected interconnection level is level 3 and said different configurations comprise different board-to-board connections.

7. The method of claim 6, wherein said selected interconnection level is level 4, and said different configurations comprise internal interconnect.

8. The method of claim 1, wherein in step (c), an initial question is presented to confirm whether said selected interconnection level is a correct interconnection level, and, if not, step (c) is repeated with said selected interconnection level corresponding to said correct interconnection level.

9. The method of claim 1, wherein in step (e), providing interconnection options comprises displaying a plurality of available products.

10. The method of claim 1, wherein providing interconnection options further comprises displaying a plurality of questions regarding the application to determine which available product is optimum for the application.

11. The method of claim 10, wherein displaying a plurality of available products comprises providing a link on each available product for specific product details and a link for available part numbers.

12. The method of claim 1, wherein in step (h), said list is displayed for said user.

13. The method of claim 1, wherein in step (h), said list is transmitted to said user and to a shipping department to have the selected products on said list shipped to a location indicated by said user.

14. The method of claim 1, wherein storing said selection comprises providing said product family link and storing said part number.

15. A system for aiding a user in selecting interconnection products, said system comprising:
    a processor; and
    a data store operatively connected to said processor;
    memory operatively connected to said processor and being configured to instruct said processor to execute at least the following steps:
        (a) providing an image to a user, said image depicting multiple interconnections, each interconnection having a reference indicating its interconnection level, each referenced interconnection level corresponding to one of level 0, level 1, level 2, level 3, level 4, level 5, level 6, or level 7 said level 0 corresponding to gate-to-gate interconnections on a silicon die, said level 1 corresponding to connections from a chip to a package of said chip, said level 2 corresponding to PCB connections, from one component to another component or to an external connector, said level 3 corresponding to connections between PCBs, including backplanes or motherboards, said level 4 corresponding to connections between subassemblies; said level 5 corresponding to connections between physically separate systems, said level 6 corresponding to external interconnections between systems and/or peripherals, and said level 7 corresponding to interconnections at a building wall plate;

(b) receiving a selected reference indicating a selected interconnection level from said user;

(c) providing at least one interconnection prompt corresponding to said selected interconnection level;

(d) receiving at least one response to said interconnection prompt;

(e) providing interconnection options responsive to said at least one response (f) receiving at least one product selection from said interconnection options and storing said product selection to a list on said data store;

(g) optionally reiterating steps (c)-(f) for another interconnection level; and (h) after step (g) or said user terminates the process, providing said list to said user.

16. The system of claim 15, wherein said processor is operatively connected to a network and said user is connected to said network via a user computer.

17. A computer-readable medium comprising: instructions for enabling a computer-based system to execute at least the following steps:

(a) providing an image to a user, said image depicting multiple interconnections, each interconnection having a reference indicating its interconnection level, each referenced interconnection level corresponding to one of level 0, level 1, level 2, level 3, level 4, level 5, level 6, or level 7 said level 0 corresponding to gate-to-gate interconnections on a silicon die, said level 1 corresponding to connections from a chip to a package of said chip, said level 2 corresponding to PCB connections, from one component to another component or to an external connector, said level 3 corresponding to connections between PCBs, including backplanes or motherboards, said level 4 corresponding to connections between subassemblies; said level 5 corresponding to connections between physically separate systems, said level 6 corresponding to external interconnections between systems and/or peripherals, and said level 7 corresponding to interconnections at a building wall plate;

(b) receiving a selected reference indicating a selected interconnection level;

(c) providing at least one interconnection prompt corresponding to said selected interconnection level of interest;

(d) receiving at least one response to said interconnection prompt;

(e) providing interconnection options responsive to said at least one response (f) receiving at least one product selection from said interconnection options and storing said product selection to a list on said data store;

(g) optionally reiterating steps (c)-(f) for another interconnection level; and (h) after step (g) or said user terminates the process, providing said list to said user.

18. The method of claim 17, wherein said image depicts at least 5 different interconnections.

19. The method of claim 1, wherein step (c) comprises reiterating steps (c)-(f) for the next interconnection level in sequence until the highest interconnection level depicted in step (a) is reached or said user terminates process, and, wherein step (h) comprises, after said highest depicted interconnection level is reached or said user terminates selection process, providing said list with interconnect links to said user.

20. The system of claim 16, wherein step (c) comprises reiterating steps (c)-(f) for the next interconnection level in sequence until the highest interconnection level depicted in step (a) is reached or said user terminates process, and, wherein step (h) comprises, after said highest depicted interconnection level is reached or said user terminates selection process, providing said list with interconnect links to said user.

21. The computer-readable medium of claim 17, wherein step (c) comprises reiterating steps (c)-(f) for the next interconnection level in sequence until the highest interconnection level depicted in step (a) is reached or said user terminates process, and, wherein step (h) comprises, after said highest depicted interconnection level is reached or said user terminates selection process, providing said list with interconnect links to said user.

* * * * *